Oct. 12, 1965  C. LENZ ETAL  3,210,822
MACHINE FOR STEM ASSEMBLY
Filed Nov. 8, 1962  6 Sheets-Sheet 1
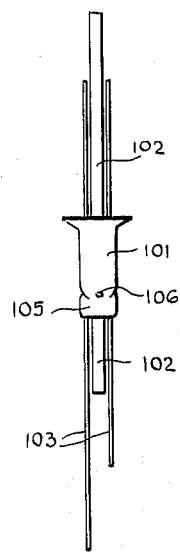
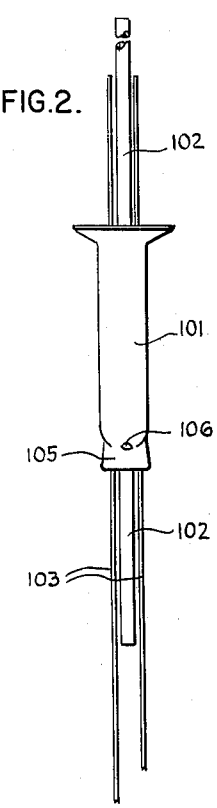
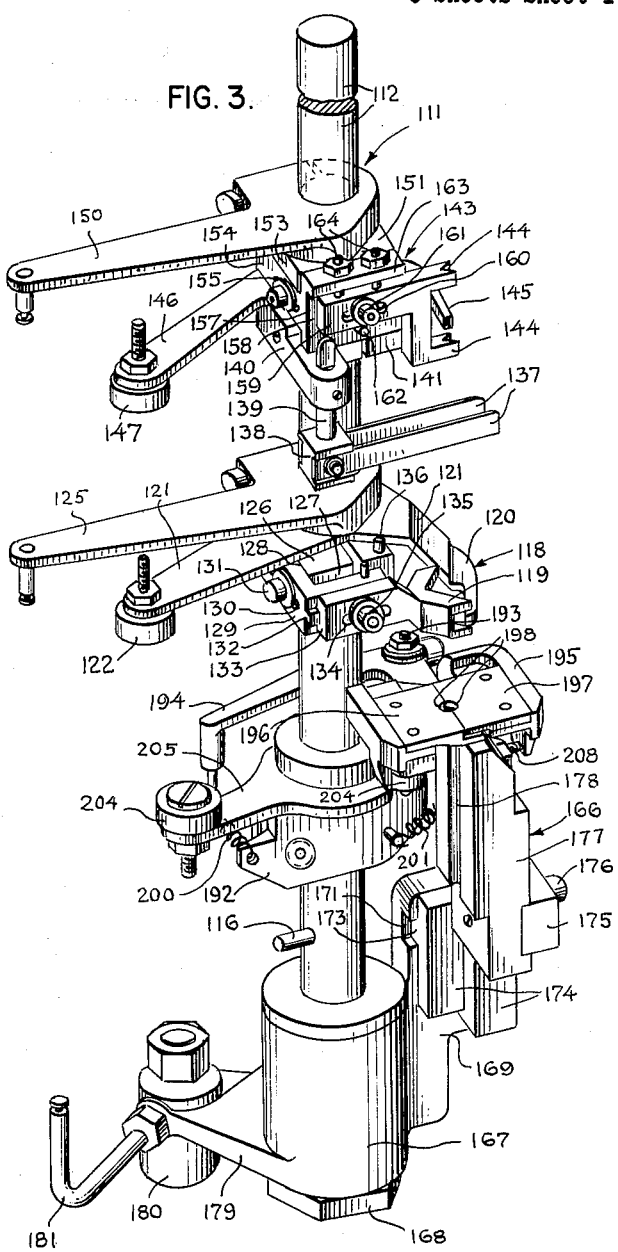
INVENTORS
OLEG J. OREBIC and
CARL LENZ, DEC'D
BY EARL J. ABERLE, EXEC.
W. D. Palmer
ATTORNEY.

Oct. 12, 1965

C. LENZ ETAL 3,210,822

MACHINE FOR STEM ASSEMBLY

Filed Nov. 8, 1962

INVENTORS
OLEG J. OREBIC and
CARL LENZ, DEC'D
EARL J. ABERLE, EXEC

BY W. D. Palmer
ATTORNEY.

Oct. 12, 1965
C. LENZ ETAL
3,210,822
MACHINE FOR STEM ASSEMBLY
Filed Nov. 8, 1962
6 Sheets-Sheet 3
FIG. 6.
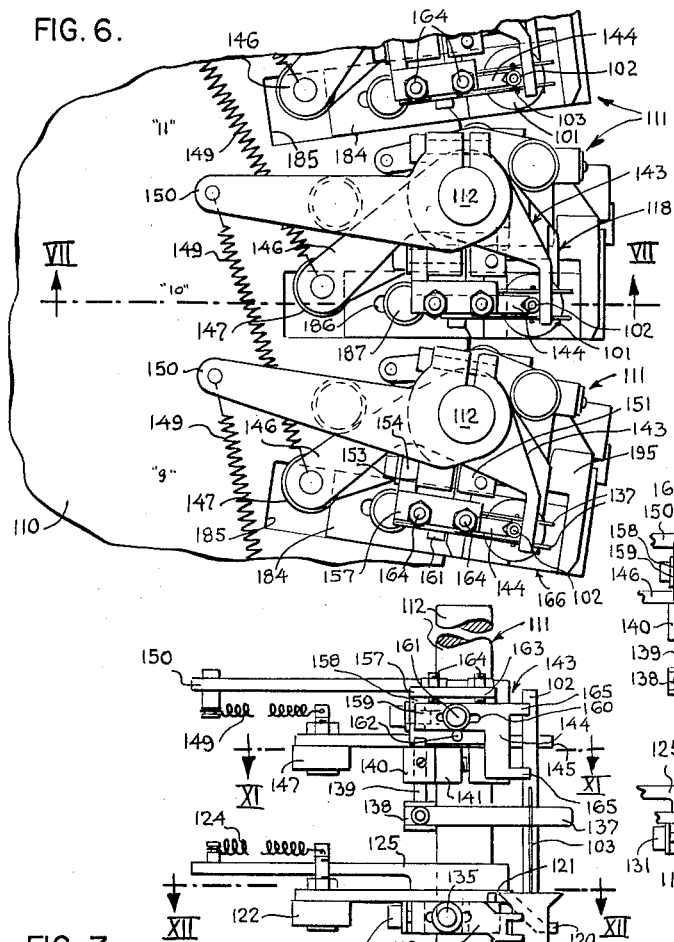
FIG. 7.
FIG. 8.
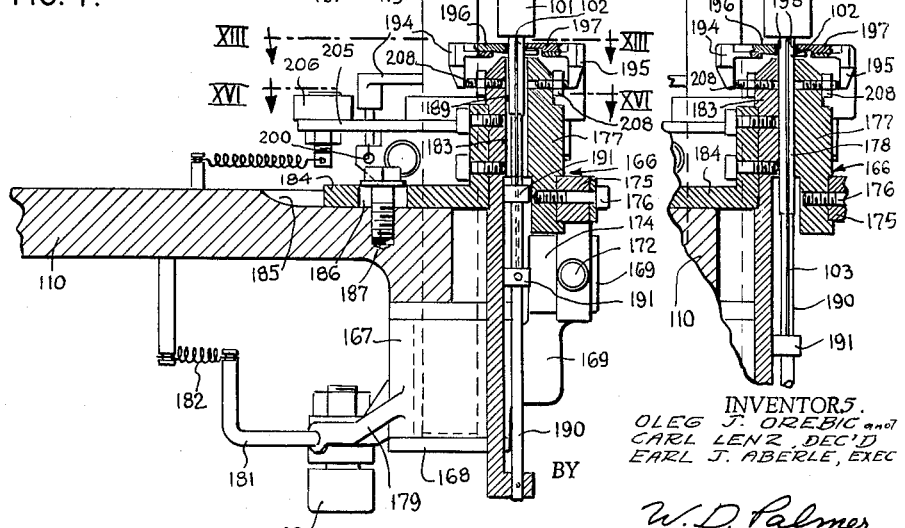
INVENTORS.
OLEG J. OREBIC and
CARL LENZ, DEC'D
EARL J. ABERLE, EXEC
BY W.D. Palmer
ATTORNEY

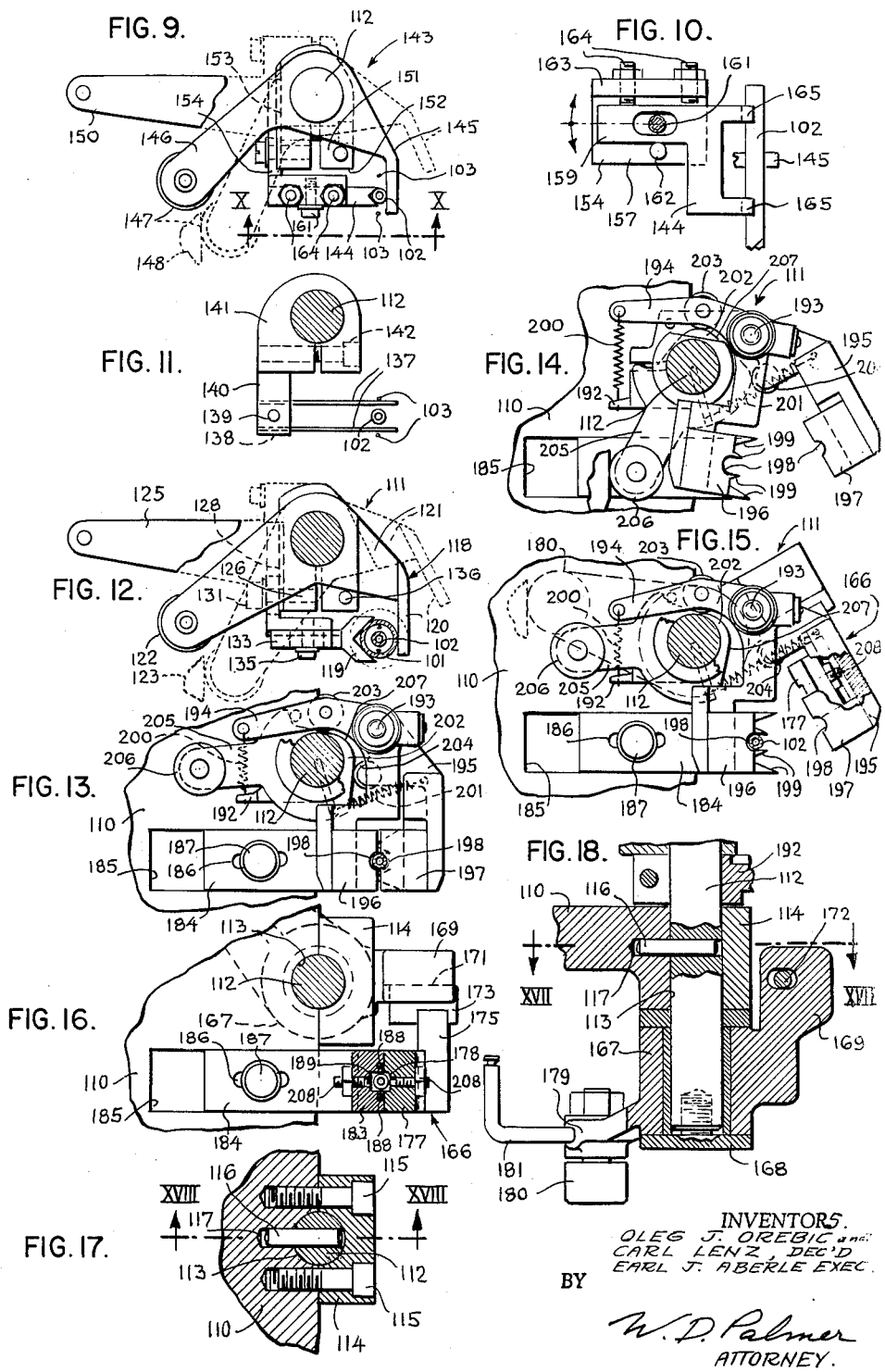

Oct. 12, 1965     C. LENZ ETAL     3,210,822

MACHINE FOR STEM ASSEMBLY

Filed Nov. 8, 1962     6 Sheets-Sheet 5

INVENTORS.
OLEG J. OREBIC and
CARL LENZ, DEC'D
BY EARL J. ABERLE, EXEC.

W. D. Palmer
ATTORNEY.

Oct. 12, 1965 C. LENZ ETAL 3,210,822
MACHINE FOR STEM ASSEMBLY
Filed Nov. 8, 1962 6 Sheets-Sheet 6

INVENTORS.
OLEG J. OREBIC and
CARL LENZ, DEC'D
BY EARL J. ABERLE, EXEC.

W.D. Palmer
ATTORNEY.

United States Patent Office 3,210,822
Patented Oct. 12, 1965

3,210,822
MACHINE FOR STEM ASSEMBLY
Carl Lenz, deceased, late of Wayne, N.J., by Earl J. Aberle, executor, Wayne, N.J., and Oleg J. Orebic, Montclair, N.J., assignors to Westinghouse Electric Corporation, Pittsburgh, Pa., a corporation of Pennsylvania
Filed Nov. 8, 1962, Ser. No. 236,453
13 Claims. (Cl. 29—25.19)

Assembly of stems for electric lamps and the like has advanced from hand operation to automation during the evolution of lamp manufacture up to the present time. The emphasis on the art at inception of the present invention is to reduce cost of manufacture by obtaining greater rapidity involved in production of the ultimate product. Primarily, therefore, this invention is directed to development of a machine capable of high speed production, and by high speed is meant the complete assembly of filament supports and stem at a rate of at least thirty-five hundred units per hour. To attain this primary objective, the machine of the present invention includes features of novelty more fully set forth hereinafter.

Among the subsidiary objects, may be listed the feature of the machine having a turret of relatively small diameter in comparison to the large number of heads, thereby minimizing movement between indexed positions of the turret to facilitate high speed operation.

As a corollary to the foregoing object, the invention proposes a construction adapted to close sequence of the heads in their locations on said turret.

Attainment of the mentioned objectives is enhanced by provision of heads each removable and replaceable as a unit and of a character capable of pre-assembly adjustment ready for proper operation when the head is applied in place on the turret.

The unitary character of each head assures, after the unit is applied to the turret, desired maintenance of alignment of the elements thereof and precision adjustments effected while the head was disassociated from the turret.

The invention provides a construction adaptable to use with a wide range of stem sizes.

An important object of the invention is to provide a construction which will permit the use of long heating flames which can be readily adjusted in order to have the highest possible B.t.u. input, which permits very high-speed operation.

As another object, the head and so-called weld pockets are both mounted on the same turret which readily absorbs heat from the operating members, thereby precluding misalignment between the flare and lead-in wires at the press position.

The invention has for a further object the provision of a construction involving the use of as few parts as possible and of readily constructed character.

Other objects, advantages and beneficial results will appear to persons skilled in the art to which the invention appertains as the description proceeds, both by direct recitation thereof and by implication from the context.

Referring to the accompanying drawings, in which like numerals of reference indicate similar parts throughout the several views;

FIGURES 1 and 2 are elevational views of completely assembled stems of 100 watt and 500 watt lamps respectively, illustrating proportionate differences in dimensions thereof and the range of adaptability of the machine of the present invention to accommodate;

FIG. 3 is a perspective view of one of the unitary heads, disassociated from the turret;

FIG. 6 is a fragmentary plan of the turret of the stem machine showing a plurality of unitary heads located and secured in place;

FIG. 7 is an elevational-sectional view taken on line VII—VII of FIG. 6, showing both jaws of the weld pocket in section and closed, and showing a 100-watt flare, exhaust tubulation and lead-in wires all in position as would occur at station 10 of FIG. 4;

FIG. 8 is an elevational-sectional view corresponding to FIG. 7, but adjusted to and having therein a flare, tubulation and lead-in wires for a 500-watt lamp;

FIG. 9 is a plan view of the tubulation gripping mechanism;

FIG. 10 is a front elevational view of said tubulation gripping mechanism as upon line X—X of FIG. 9;

FIG. 11 is a sectional view on line XI—XI of FIG. 7, showing the finger-guides for the lead-in wires;

FIG. 12 is a sectional view on line XII—XII of FIG. 7, showing the flare-gripping mechanism;

FIG. 13 is a sectional view on line XIII—XIII of FIG. 7, showing the weld pocket closed and holding the tubulation and lead-in wires in place, as occurs at station 10 of FIG. 4;

FIG. 14 is a sectional view similar to FIG. 13, but showing the weld pocket open, as would occur at stations 4 to 8 of FIG. 4;

FIG. 15 is a view similar to FIG. 14, but showing the weld pocket in its discharge position as would occur at station 43 of FIG. 4;

FIG. 16 is a sectional view on line XVI—XVI of FIG. 7, with the weld pocket closed;

FIG. 17 is a sectional view on line XVII—XVII of FIG 18, showing the means securing and orienting the head to the turret;

FIG. 18 is a vertical sectional view on line XVIII—XVIII of FIG. 17;

Figure 5:
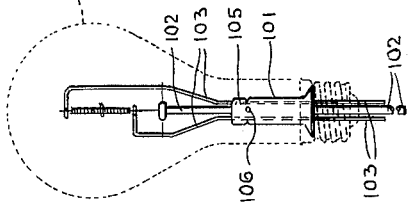
FIG. 5 is an elevation of a finished mount for a 500 watt lamp in condition prevailing upon leaving the mounting machine.

Before entering upon the description of the machine of the invention, it may be pointed out that the present disclosure has been arbitrarily chosen as applying to electric lamps, but is not restricted thereto, as other electric or electronic devices employing flares, tubulations and lead-in wires to be assembled as a complete stem, are to be understood as included when, for brevity, mention is made to lamps as the product involved. Such electric devices are made in various sizes, and for illustrative purposes, the specific disclosure herein has arbitrarily selected two of the numerous sizes which are designated in FIGURES 1 and 2 as 100W and 500W stems respectively. It is understood in the art, that a stem comprises a portion 101 of glass or the like known as the flare, through which is located a tubulation 102 usually substantially coaxial to said flare, and between the tubulation and flare there are such number as may be required of lead-in wires 103. The flare derives its name because one end thereof is expanded to flare outwardly for ultimately sealing to the glass or other envelope 104 (see FIG. 5). During fabrication in the stem machine, the end of said flare 101 opposite from the expanded or flared end, is compressed, forming a so-called press 105, thereby sealing the tubulation and lead-in wires in fixed position in the flare, and closing the tubulation where passing through the press. A blow-hole 106 is made from the tubulation laterally through the press to provide an exhaust passage to the interior of the envelope 104.

The machine—Generally

Figure 4:
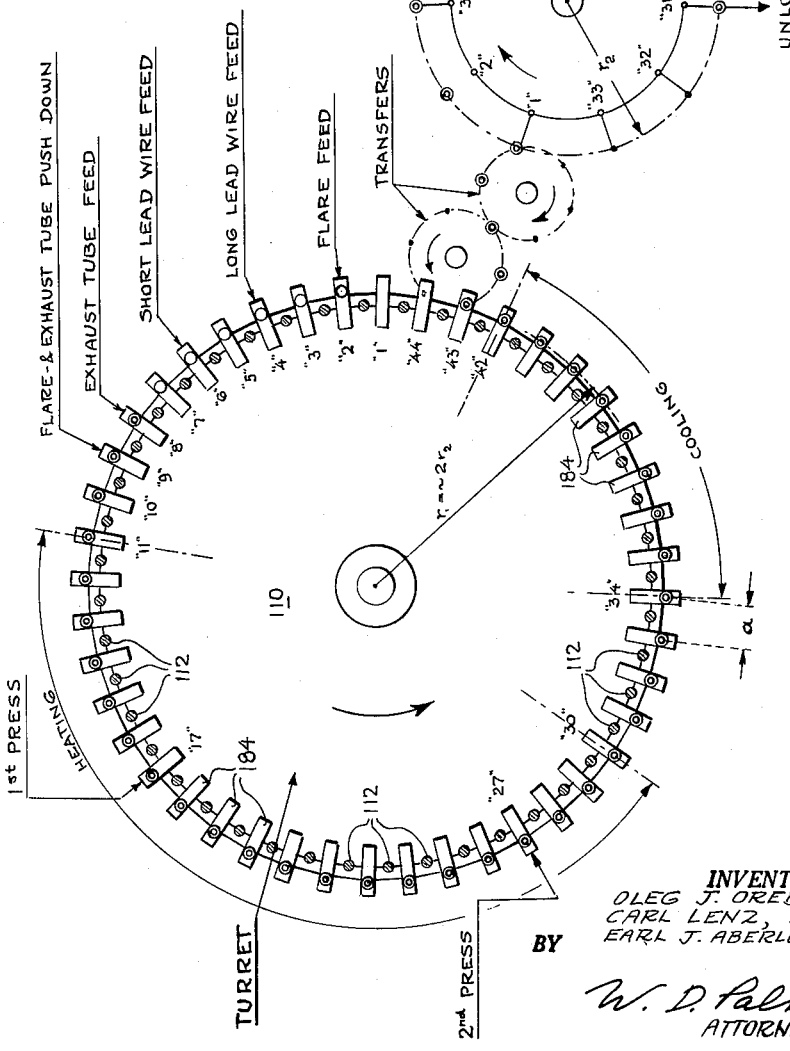
FIG. 4 is a diagrammatic plan of a stem machine having forty-four heads on its turret and diagrammatically showing the transfer for completed stems to a mounting machine having thirty-three mounting positions.
Figure 19:
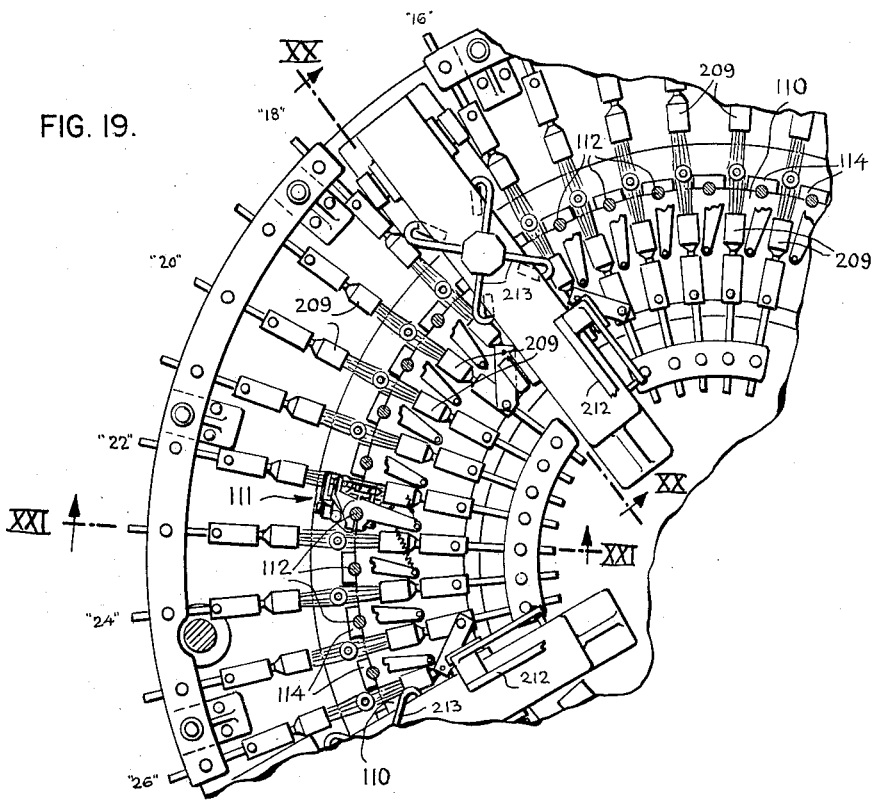
FIG. 19 is a fragmental plan of the stem machine, but for simplicity of drawing, showing only one complete head, the others being indicated merely by presence of cross-hatched supporting post thereof.
Figure 20:
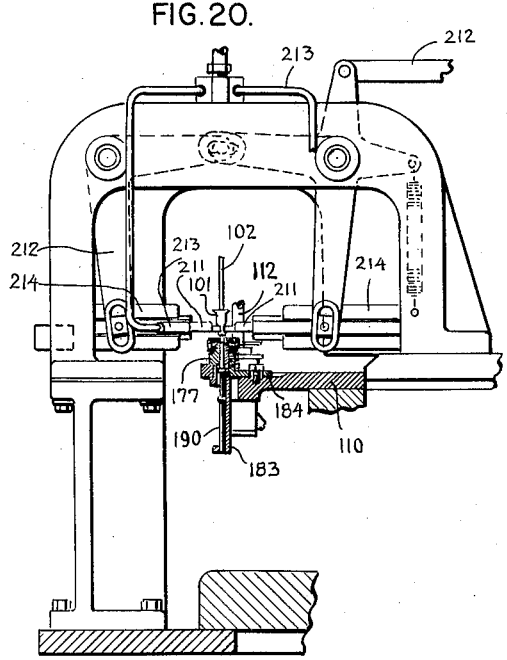
FIG. 20 is a vertical section on line XX—XX of FIG. 19, showing the press of the stem formed with both of the press-forming matrices in their press-forming positions.
Figure 21:
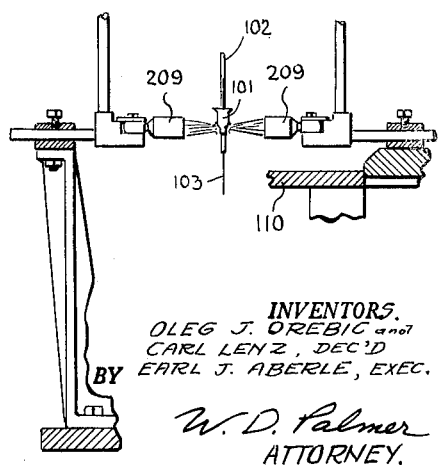
FIG. 21 is a vertical sectional view on line XXI—XXI of FIG. 19, showing the burners and means for adjusting the same.

Referring now to the machine by which the fabrication of the above-described stem is accomplished, the specific construction selected for this disclosure provides a turret 110 which is suitably driven to index with a step-by-step rotation indicated by the arrow in FIG. 4 as counter-clockwise. The turret carries a plurality of heads 111 (FIG. 3) next to its periphery, arranged in a circular series with minimum spacing one from another such that with each indexing motion of the turret, a next succeeding head is moved into the position vacated by the preceding head. Each such position is herein referred to as a station, and in the diagrammatic showings of FIGS. 4 and 22, there are forty-four stations. This large number of stations and corresponding number of heads is obtainable according to the present invention by locating the heads very close together. In fact, as viewed in plan in FIG. 6, there is no more than just clearance space between successive heads. Such closeness, however, makes it very difficult, or even impossible, to make adjustments on the heads in place, and as a feature of the invention, the heads are each made as a unit readily removable and replaceable in oriented position, so the necessary changes or adjustments can be made on any unit while the same is disassociated from the turret.

The stem head—Generally

Each unitary head, one of which is illustrated in its entirety in FIG. 3, includes a preferably cylindrical post 112 which carries the various fixed elements and movable elements hereinafter described in detail and which, with the post, constitute said head. By virtue of the cylindrical character of said post, the same will function as bearings on which certain of the movable elements may be oscillated. When the post is removed from the turret, all of the elements carried thereby come away from the turret with the post. As shown in FIGS. 17 and 18, the peripheral edge of the turret is provided with vertical semi-circular hollows 113 into which the post may be laterally seated and in which it is held by a clamp 114 held by bolts 115 passing through end portions of the clamp and threaded into the turret. A pin 116 (FIGS. 3, 17 and 18) projects radially from said post into a corresponding hole 117 in the turret, radially of the turret, both to orient the post and prevent the post from rotating or sliding when assembled in place on the turret. The post extends both above and below the level of the turret.

Flare-receiving mechanism

At an intermediate part of the upwardly projecting portion of said post 112 there is provided a flare-gripping or receiving means or mechanism 118 (FIGS. 3 and 12) which receives and holds a flare in upright position with the flared end upward. When the machine is set up for operating with respect to long flares, the said mechanism is adjusted to a position higher up on the post, as shown in FIG. 8, than for short flares as shown in FIG. 7.

Considering this flare-gripping mechanism more in detail, it may be observed that it provides a jaw 119 which is normally fixed, although it is adjustable to the desired fixed position. In association with the fixed jaw 119 is a movable jaw 120 opposed thereto so as to include the flare between the jaws when received therein as a result of said flare having been released and dropped from the supply bin (not shown) in accordance with prior art practice. The movable jaw 120 is constituted as a prong projecting laterally at the end of a first class lever 121 trunnioned on post 112, the other end of said lever having a roller 122 thereon for engaging a cam 123 (FIG. 12) at the proper station, here indicated as station number 2, so as to open the receiving cavity between the jaws. The movable jaw 120 is normally pressed toward the fixed jaw, and flare when present, by a spring 124 (FIG. 7). Above said trunnioned lever 121 is an anchor arm 125 which is clamped in fixed position upon post 112. To conserve space and yet utilize a spring of adequate length and at an appropriate angle, the spring 124 attached to the movable jaw 120 of one head, has its other end attached to the anchor arm of the next adjacent head.

The relatively fixed jaw 119 above mentioned as part of the flare-gripping mechanism, has two-dimensional adjustment in a plane perpendicular to the axis of post 112. In other words, the jaw may be adjusted in a forwardly-rearwardly direction and may be also adjusted in a side-to-side direction. The specific structure for accomplishment of these adjustments includes provision of a split collar 126 clamped in fixed position on post 112. One edge of said collar provides what may be termed a front face 127 which is perpendicular to the split of the collar and parallel to the post axis. A side face 128 is provided on the collar, at right angles to the said front face and also parallel to the post axis. A right-angle bracket 129 has one leg thereof slotted longitudinally at 130 and clamped by screw 131 in adjusted position on said side face 128 of the collar 126. The other leg of said right-angle bracket 129 is in parallelism to said front face 127 of the collar 126, and has on its front side longitudinally thereof, a track 132. Said relatively fixed jaw 119 provides a rearwardly projecting stem 133 interengaging with said track so as to be guided longitudinally thereby. Said stem also has a longitudinal slot 134 receiving a lock-screw 135 passing therethrough into threaded engagement with the track arm. It may be noted that the relatively fixed jaw is of channel formation with the parallel walls of the channel in horizontal planes and the front edges of V-shape. The movable jaw 120 is in the form of a prong at a level between the planes of the said parallel walls of the relatively fixed jaw 119, and consequently, when pressing the flare against the fixed jaw will both cause the flare to seat against the V-shaped edges and will hold the flare in axial parallelism to the post 112. A stop-pin 136 projecting upwardly from the top of fixed collar 126 is located in the path of swing of the movable jaw lever 121 to limit inward swing of the movable jaw in absence of a flare.

Figure 22:
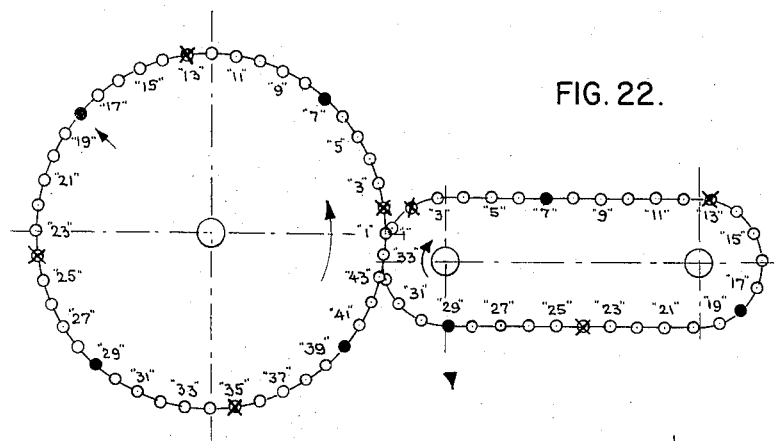
FIG. 22 is a diagrammatic view of the relationship of certain number of heads of the stem machine and a certain number of receivers on the mounting machine by which the faulty stems may be quickly traced to the particular head on which assembled.
Figure 23:
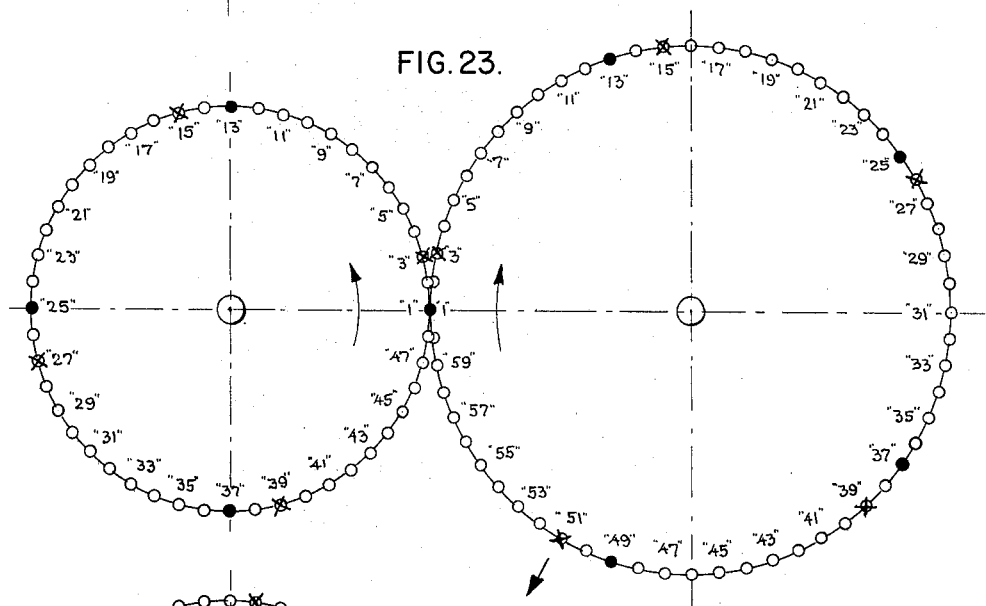
FIGS. 23 and 24 are diagrammatic views similar to FIG. 22, showing other specific relationship for the same purpose.
Figure 24:
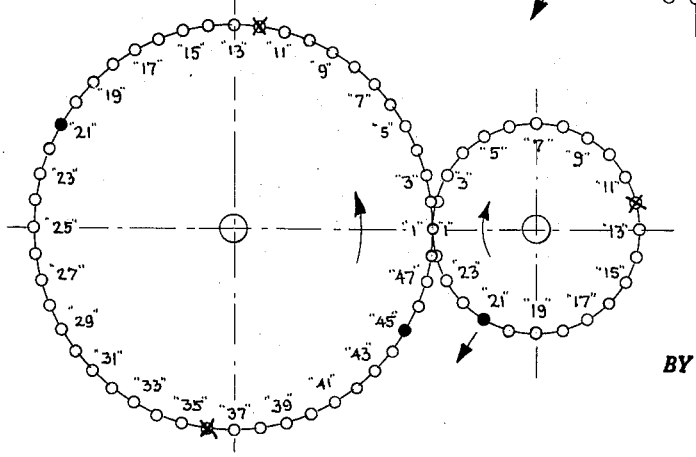

Above said flare-gripping mechanism 118, and also carried by said post 112, and adjusted thereon to have a proper fixed position, are resilient finger-guides 137 for guiding the lead-in wires 103 and for keeping them separated on opposite sides of the flare axis as they are dropped longitudinally into said flare to positions of projection both above and below the flare. Said finger-guides project laterally from a block 138 off-set from post 112. Said block, as shown best in FIGS. 3, 7 and 8, is fixed on the lower end of a shank 139 which is rotatably and longitudinally adjustable in and depends vertically parallel to post 112 from an arm 140. Said arm is conveniently formed as part of a gripping collar 141 mounted on said post 112 and adapted to be tightened thereon in adjusted position by a clamping screw 142 (see FIG. 11).

machines of FIGS. 4 and 22 are indicated as having forty-four heads and stations, in conjunction with a mounting machine having thirty-three stations. Both numbers are therefore divisible by eleven to obtain quotients of four and three. This means that when a defective stem comes off a specified head of the mounting machine, it will only be necessary to inspect four of the stem machine heads to determine the one that is functioning improperly. Other combinations may be employed, so that as shown in FIG. 23, forty-eight stations on the stem machine feed sixty stations on the mounting machine. Both numbers are divisible by twelve which again means it is only four of the stem machine heads that need inspection to determine which one is functioning improperly. Where the stem machine has forty-eight stations and the mounting machine only twenty-four, as indicated in FIG. 24, only one of two suspected stations will be the culprit. For any combination, a chart can be made from which the suspected heads, by number, may be shown in tabular form which supply stems to the numbered stations of the mounting machine, so that immediately upon noting a defective stem in a certain station of the mounting machine, the numbered stations of the stem machine to be investigated will immediately be known. As a practical matter, the quotient of the total number of heads on the stem machine divided by the common number should be not greater than four, in order to avoid excessive inspections.

It will be recognized that the objects of the invention have been achieved by providing a stem-making machine which operates at very high rates of speeds, has few moving parts, and is not subject to misadjustment during operation. In addition, adjustment can be made to individual heads of the machine when the heads are removed from the machine.

While one best embodiment has been illustrated and described in detail, it is to be particularly understood that the invention is not limited thereto or thereby.

What is claimed is:

1. In combination with a turret, a head comprising a unit having a post, a flare-receiving and gripping mechanism on said post, tubulation receiving and gripping mechanism on said post, lead-in wire guiding mechanism on said post, and a weld pocket constituted by two members of which one is relatively fixed to said turret and the other is movable and carried by said post, and means for orienting and holding said post on said turret with said weld pocket members cooperatively opposed one to the other.

2. In combination with a turret, a circular series of heads in closed succession affixed to the periphery of said turret, each of said heads having a post and also having flare, tubulation and lead-in wire guiding mechanisms and a movable weld pocket member all mounted on each said post and constituting therewith a unitary head, brackets on said turret between said posts, the distance between said brackets and said posts approximately equal to the diameters of said posts thereby obtaining close succession of heads on the turret, a relatively fixed weld pocket member carried by each said bracket, and each said relatively fixed weld pocket member cooperatively opposed to a corresponding one of said movable weld pockets.

3. In combination with an indexable turret, a circular series of heads in close succession at the periphery of said turret, each of said heads having a post and having flare, tubulation, lead-in wire guiding mechanisms and a movable weld pocket member all mounted on each said post and constituting therewith one of said heads, a fixed weld pocket member fixed to said turret for each said head, said mechanisms and weld pocket members receiving and retaining work pieces at a location midway between successive posts, and burner nozzles directed toward the location of said work pieces when work pieces are at rest at indexed positions of the turret whereby the burner flames are directed on the work pieces and between the posts and impinge on said posts only as the posts are moved to a successive position by the indexing of the turret.

4. In combination with a turret, a head comprising a unit having a post, a flare-receiving and gripping mechanism on said post, tubulation receiving and gripping mechanism on said post, lead-in wire guiding mechanism on said post, and a weld pocket constituted by two members of which one is relatively fixed to said turret and the other is movable and carried by said post, each of said mechanisms and members having means for establishing symmetry of relative locations of an assembly of flare, tubulation and lead-in wires admitted to said mechanisms and weld pocket.

5. In combination with a turret, a head comprising a unit having a post, a flare-receiving and gripping mechanism on said post, tubulation receiving and gripping mechanism on said post which said mechanism provides teetering means for establishing angularity of a tubulation gripped thereby, lead-in wire guiding mechanism on said post, and a weld pocket constituted by two members of which one is relatively fixed and the other is movable and carried by said post, each of said mechanisms and members having means for establishing symmetry of relative locations of an assembly of flare, tubulation and lead-in wires admitted to said mechanisms and weld pocket.

6. In combination with a turret, a head comprising a unit having a post, a flare-receiving and gripping mechanism on said post, tubulation receiving and gripping mechanism on said post, lead-in wire guiding mechanism on said post, a weld pocket consituted by two members of which one is relatively fixed directly to said turret and the other is movable and carried by said post, both of said members terminating at the same level at their upper ends, and swingable locators proximate to said upper ends for engaging and positioning lead-in wires at point of entry thereof in said weld pocket.

7. The combination of a stem forming machine and a mounting machine wherein the mounting machine receives work pieces automatically from the stem machine, both of said machines having work-receiving stations, the number of stations on the mounting machine having such relation to the number of stations on the stem forming machine that the numbers of both are divisible by another numerical value for readily ascertaining at which station of the stem forming machine defective work is being performed.

8. The combination of a stem-making machine and a filament-mounting machine, said stem-making machine having a plurality of component-parts-receiving and carrying heads adapted to be indexed to and from a plurality of work stations to permit successive stem-fabricating operations to be performed, transfer means for successively transferring completed stems from the heads of said stem-making machine to a plurality of heads carried on said filament-mounting machine, the heads carried on said filament mounting machine adapted to receive additional component parts and also adapted to be indexed to and from a plurality of work stations to permit successive filament-mounting operations to be performed, and the total number of heads of said stem-making machine and the total number of heads of said filament-mounting machine both being divisible by a common number to provide different whole number quotients, with the quotient of the number of total heads of said stem-making machine divided by such common number being no greater than four.

9. A stem-making machine for fabricating stems for lamps or the like from flares, tubulations, and lead-in wires, said machine comprising:

(A) a circular turret movable with an indexing motion;

(B) a plurality of work heads affixed to the circular periphery of said turret and positioned in close proximity to each other, each of said heads comprising, (a) a supporting post, (b) a flare-receiving means affixed to said post and operable to receive and retain a flare in predetermined position on said head, (c) a tubulation-receiving means affixed to said post and operable to receive and retain a tubulation in predetermined position on said head, and (d) a weld-pocket means formed by a first member affixed to said turret and a second member affixed to said post, said weld-pocket means operable to receive and retain lead-in wires in predetermined position on said head, (C) fixed heating means operable to produce sealing fires and disposed proximate to a selected portion of the path of movement of the periphery of said turret, the sealing fires produced by said heating means directed radially with respect to said turret and toward said heads, when said turret is stationary between indexes the sealing fires emanated from said heating means operable to rapidly heat to a softened condition selected portions of the flares and tubulations retained on said heads; and (D) press means positioned proximate to a selected portion of the path of movement of the periphery of said turret, said press means having press jaws movable toward one another and radially with respect to said turret, when said turret is stationary between indexes said press jaws operable to compress previously heated portions of the tubulations and flares retained on said heads to form an hermetic press seal about a portion of the lead-in wires as retained by said weld-pocket means.

10. The machine as specified in claim 9, wherein said heads are removably affixed to said turret.

11. The machine as specified in claim 10, wherein said flare-receiving means, said tubulation-receiving means, and the second member of said weld-pocket means are all adjustably affixed in predetermined position on said post.

12. The machine as specified in claim 11, wherein the first member of said weld-pocket means is adjustably affixed to said turret.

13. A stem-making machine for fabricating stems for lamps or the like from flares, tubulations, and lead-in wires, said machine comprising:

(A) a circular turret movable with an indexing motion;

(B) a plurality of work heads affixed to the circular periphery of said turret and positioned in close proximity to each other, each of said heads comprising, (a) a supporting post affixed to said turret, (b) a flare-receiving means comprising a fixed member and a movable member both affixed to said post and operable to receive and retain therebetween a flare in predetermined position on said head, (c) a tubulation-receiving means comprising a fixed member and a movable member both affixed to said post and operable to receive and retain therebetween a tubulation in predetermined position on said head, and (d) a weld-pocket means formed by a fixed first member affixed to said turret and a movable second member affixed to said post, said weld-pocket means operable to receive and retain therebetween lead-in wires in predetermined position on said head, (C) fixed heating means operable to produce sealing fires and disposed proximate to a selected portion of the path of movement of the periphery of said turret, the sealing fires produced by said heating means directed radially with respect to said turret and toward said heads, when said turret is stationary between indexes the sealing fires emanated from said heating means operable to rapidly heat to a softened condition selected portions of the flares and tubulations retained on said heads; and (D) press means positioned proximate to a selected portion of the path of movement of the periphery of said turret, said press means having press jaws movable toward one another and radially with respect to said turret, when said turret is stationary between indexes said press jaws operable to compress previously heated portions of the tubulations and flares retained on said heads to form an hermetic press seal about a portion of the lead-in wires as retained by said weld-pocket means.

References Cited by the Examiner
UNITED STATES PATENTS

| | | | |
|---|---|---|---|
| 2,590,904 | 4/52 | Titus | 29—25.2 |
| 2,637,144 | 5/53 | Gardner | 29—25.2 |
| 3,063,130 | 11/62 | Swasey | 29—25.19 |

RICHARD H. EANES, Jr., *Primary Examiner.*